US010812581B2

(12) United States Patent
Nelluri et al.

(10) Patent No.: US 10,812,581 B2
(45) Date of Patent: Oct. 20, 2020

(54) HETEROGENEOUS DISTRIBUTED LEDGER DATA CURATOR

(71) Applicant: BANK OF AMERICA CORPORATION, Charlotte, NC (US)

(72) Inventors: Govinda Rajulu Nelluri, Hyderabad (IN); Srinivasa Rao Dakshinyam, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 82 days.

(21) Appl. No.: 16/158,441

(22) Filed: Oct. 12, 2018

(65) Prior Publication Data

US 2020/0120158 A1    Apr. 16, 2020

(51) Int. Cl.
| | | |
|---|---|---|
| H04L 29/08 | (2006.01) | |
| G06Q 10/06 | (2012.01) | |
| G06F 16/18 | (2019.01) | |
| G06F 16/182 | (2019.01) | |

(52) U.S. Cl.
CPC ...... *H04L 67/1078* (2013.01); *G06F 16/1805* (2019.01); *G06F 16/1834* (2019.01); *G06Q 10/063* (2013.01); *H04L 67/10* (2013.01); *H04L 67/1097* (2013.01); *H04L 67/104* (2013.01)

(58) Field of Classification Search
CPC .... H04L 67/10; H04L 67/104; H04L 67/1097
See application file for complete search history.

(56) References Cited

U.S. PATENT DOCUMENTS

| 10,102,265 | B1 | 10/2018 | Madisetti et al. | |
|---|---|---|---|---|
| 2008/0114873 | A1* | 5/2008 | Chakravarty | ....... G06F 11/3072 709/224 |
| 2008/0250004 | A1* | 10/2008 | Dettinger | .............. G06F 16/903 |
| 2012/0078994 | A1* | 3/2012 | Jackowski | .............. H04L 47/24 709/202 |
| 2017/0132625 | A1 | 5/2017 | Kennedy | |
| 2017/0132626 | A1 | 5/2017 | Kennedy | |
| 2017/0243286 | A1 | 8/2017 | Castinado et al. | |
| 2017/0262778 | A1 | 9/2017 | Ganesan et al. | |
| 2017/0293503 | A1 | 10/2017 | Curtis | |
| 2017/0295232 | A1* | 10/2017 | Curtis | ..................... G06F 9/466 |
| 2017/0352027 | A1 | 12/2017 | Zhang et al. | |
| 2018/0005186 | A1 | 1/2018 | Hunn | |
| 2018/0018723 | A1 | 1/2018 | Nagla et al. | |
| 2018/0039667 | A1 | 2/2018 | Pierce et al. | |
| 2018/0082043 | A1 | 3/2018 | Witchey et al. | |

(Continued)

*Primary Examiner* — Jeong S Park
(74) *Attorney, Agent, or Firm* — Michael A. Springs; Moore & Van Allen PLLC; James C. Edwards (57) ABSTRACT

The collection of data from multiple different Distributed Ledger Technology (DLT) networks is managed for a large-scale work flow having multiple interdependent data collection processes. Embodiments of the invention are configured to coordinate and orchestrate the collection of data from any DLT network and communicate the data to any legacy system requiring such. As a result, the invention can leverage the areas of expertise afforded by each of the different DLT networks used to conduct interdependent data collection processes of the work flow. In addition, through use data collection extensions the present invention provides the capability to collect data from any known or future known DLT network and communicate the data to any requesting legacy system.

19 Claims, 5 Drawing Sheets

(56) References Cited

U.S. PATENT DOCUMENTS

| | | |
|---|---|---|
| 2018/0089759 A1 | 3/2018 | Stradling et al. |
| 2018/0091316 A1 | 3/2018 | Stradling et al. |
| 2018/0157825 A1 | 6/2018 | Eksten et al. |
| 2018/0189658 A1 | 7/2018 | Sanchez et al. |
| 2018/0218455 A1 | 8/2018 | Kolb et al. |
| 2018/0284758 A1* | 10/2018 | Cella ............... G06N 3/088 |
| 2018/0285996 A1 | 10/2018 | Ma |
| 2018/0315145 A1 | 11/2018 | Darnell et al. |
| 2018/0329693 A1 | 11/2018 | Eksten et al. |
| 2018/0336267 A1* | 11/2018 | Rogers ............ G06F 16/1837 |
| 2020/0074516 A1* | 3/2020 | Yamakado ........ G06Q 30/04 |

\* cited by examiner

HETEROGENEOUS DISTRIBUTED LEDGER DATA CURATOR

FIELD

In general, embodiments of the invention relate to distributed ledger technology networks, and more specifically, systems and the like for managing the work flow for interdependent processes that implement multiple different distributed ledger technology networks.

BACKGROUND

The use of Distributed Ledger Technology (DLT) networks, otherwise referred to as peer-to-peer networks, is becoming more prevalent within enterprises which have a need to insure the authenticity and veracity of data. A DLT network, such as blockchain network or the like, is a database distributed amongst various nodes that form that the network. The database maintains a list of data records, or the like, with the security of the data maintained within the database enhanced by the distributed nature of the DLT network.

In the enterprise scenario, many large-scale work flows will entail multiple different interdependent data-related processes, otherwise referred to as a task or the like, that need to completed in order for overall work flow to be successfully completed. Each of the interdependent processes may be associated with a different domain within the enterprise and may implement one or more legacy systems as a means of accomplishing the associated process. In the event that the large scale work flow desires to leverage DLT as a means of conducting the interdependent processes (i.e., collecting data and the like) current practices are limited to implementing a single DLT network for all of the interdependent data collection functionality. This means that all of the interdependent processes for a specific large-scale work flow need to be executed on one specific DLT network and, as such, the legacy systems implemented by each of the domains associated with each of the interdependent processes need to be executed on the specific DLT network.

However, while DLT networks are typically not limited to one specific use case (i.e., data collection process or task), many DLT networks have one or more areas of expertise in terms of use (i.e., each DLT network is especially suited to conduct one or more specific data collection processes, tasks or the like). In the event that a large scale work flow is limited to a specific DLT network to conduct all or most of the interdependent data collection processes, the large scale work flow in unable to benefit from specific areas of expertise afforded by different DLT networks.

Therefore, a need exists to develop systems, methods and the like for implementing multiple different Distributed Ledger Technology (DLT) networks to conduct a large-scale work flow having multiple interdependent data collection processes. As such, the desired systems, methods and like will be able to leverage the areas of expertise afforded by each of the different DLT networks used to conduct one or more of the interdependent data collection processes of the work flow. In addition, the desired systems and methods and the like should provide for a means of managing, the workflow and specifically the interdependent data collection processes conducted on multiple different DLT networks. In this regard, the systems and methods should provide for a means for organizing and integrating the collection of data from various different DLT networks. Moreover, the management aspect of the systems, methods and the like should act as a gateway between the legacy systems within the domains of the enterprise and the DLT networks, eliminating the need to execute the legacy systems on the different DLT networks.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, apparatus, computer program products, for managing the collection of data from multiple different Distributed Ledger Technology (DLT) networks for a large-scale work flow having multiple interdependent data collection processes. The invention provides for a data curator that is able to coordinate and orchestrate the collection of data from any DLT network to any legacy landscape, such as, different legacy domains within an enterprise. The data curator is able to receive configuration information and identify the work flow steps and order of the work flow steps for the large-scale work flow. As such, the data curator is able to manage and initiate data collection processes, in a specified order, across multiple different DLT networks. In addition, the data curator relies on profile handlers, which have a profile that is specific to a data collection process, a DLT network and dependent upon a functional domain. The profile provides the steps that are to be performed at the DLT/network node for the specific data collection process. As such the data curator can rely on the profile handler to verify that the required data collection operation has been properly completed at the specified DLT network/node.

In addition, the invention relies on data collection extensions, otherwise referred to as plug-ins that are deployed at a node of each of the specific DLT networks (e.g., a node associated with the enterprise undertaking the large-scale work flow). The data collection extensions are configured to receive calls outs from the data curator and, in response, extract the data from the DLT's distributed ledgers and communicate the data back to the data curator in an organized fashion. In specific embodiments, the data collection extensions include a data collection layer, which provides for the data collection extension to effectively manage the data collection process. Moreover, efficiency in data collection is made possible by the data collection extension having the capability to segregate data according to data type in corresponding data structures within one of physical memory or logical memory from the specific DLT network managed ledger.

As such, the present invention is capable of managing a large-scale work flow having multiple different interdependent data collection processes conducted on different DLT networks. As a result, the present invention can leverage the areas of expertise afforded by each of the different DLT networks used to conduct interdependent data collection processes of the work flow. In addition, through the use of data collection extensions the present invention provides the capability to collect data from any known or future known DLT network. Moreover, use of a common data transport layer provided to the legacy domain systems allow for any legacy domain system to communicate with the data curator as a means of requesting and receiving DLT network stored data.

A system for managing a work flow executed across a plurality of Distributed Ledger Technology (DLT) networks defines first embodiments of the invention. The system includes a computing platform having a memory and at least processor in communication with the memory. A data curator is stored in the memory and executable by the processor. The data curator is configured to receive configuration information for conducting the work flow. The work flow includes a plurality of data collection processes executed on a plurality of DLT networks. The configuration information is used to identify work flow steps and specify an order for the work flow steps. The data curator is further configured to manage the work flow by (i) initiating the identified work flow steps in the specified order, and (ii) implementing a plurality of profile handlers. Each profile handler including a profile of data collection steps for a specific data collection process of the work flow that is executed by a respective one of the DLT networks. The system additionally includes a plurality of data collection extensions. Each data collection extension is stored within and executed on a node within one of the plurality of DLT networks. Each data collection extension is configured to receive a call out from the data curator to perform a data collection process included with the work flow, extract data from a distributed ledger within a corresponding DLT network; and communicate the data to the data curator.

In specific embodiments of the system the data curator is further configured to manage the work flow by implementing the plurality of profile handlers to insure that the data collection steps in the profile have been executed by the respective one of the DLT networks.

In other specific embodiments of the system the data curator is further configured to manage the work flow by (iii) communicating the data received from the plurality of DLT networks to one of more of a plurality of legacy systems within an enterprise requiring the data.

In still further embodiments of the system the data collection extensions are further configured to segregate data according to data type in corresponding data structures within one of physical memory or logical memory.

In additional embodiments of the system the data collection extensions further comprise a data collection layer configured to manage the connectivity between the data curator and the data collection extension. In other specific embodiments of the system, the data curator further comprises a data transport layer configured to manage connectivity between the data curator and the plurality of legacy systems.

In still further specific embodiments the system includes a configuration assistant that is stored in the memory and executable by the processor, the configuration assistant is configured to receive first inputs that define the configuration information that manage the work flow. In additional embodiments of the system, the configuration assistant is configured to receive second inputs that are configured to onboard a legacy system.

In other specific embodiments of the system the data curator is further configured to receive a work flow-related query from a legacy system and, in response to receiving the query, make a call out to one or more of the data extensions to determine an answer to the query.

A computer-implemented method for managing a work flow executed across a plurality of Distributed Ledger Technology (DLT) networks defines second embodiments of the invention. The computer-implemented method is executed by one or more processing devices. The computer-implemented method includes receive configuration information for conducting the work flow, the work flow including a plurality of data collection processes executed on a plurality of DLT networks. The method further includes identifying work flow steps and specifying an order for the work flow steps based on the confirmation information. Additionally, the computer-implemented method includes managing the work flow by (i) initiating the identified work flow steps in the specified order, and (ii) implementing a plurality of profile handlers to verify execution of the data collection processes at respective DLT networks, wherein each profile handler includes a profile of data collection steps for a specific data collection process of the work flow. Further, the method includes deploying and executing a plurality of data collection extensions at a node within each of the plurality of DLT networks to (i) receive a call out to perform a data collection process included with the work flow, (ii) extract data from a distributed ledger within a corresponding DLT network, and (iii) communicate the data to a work flow managing-entity.

In specific embodiments of the computer-implemented method managing the work flow further comprises managing the work flow by (iii) communicating the data received from the plurality of DLT networks to one of more of a plurality of legacy systems within an enterprise requiring the data.

In further specific embodiments the computer-implemented method includes executing the data collection extension to segregate data according to data type in corresponding data structures within one of physical memory or logical memory.

In still further specific embodiments of the computer-implemented method deploying and executing the plurality of data collection extensions further includes creating a data collection layer within the data collection extensions that is configured to manage connectivity between the data collection extension and the work flow managing-entity. Moreover, in further specific embodiments the computer-implemented method includes creating a data transport layer configured to manage connectivity between the work flow managing-entity and the plurality of legacy systems.

In additional specific embodiments the computer-implemented method includes receiving a work flow-related query from a legacy system and, in response to receiving the query, make a call out to one or more of the data extensions to determine an answer to the query.

A computer program product including a non-transitory computer-readable medium defines third embodiments of the invention. The computer-readable medium includes a first set of codes for causing a computer to receive configuration information for conducting the work flow, the work flow including a plurality of data collection processes executed on a plurality of DLT networks. In addition, the computer-readable medium includes a second set of codes for causing a computer to identify work flow steps and specify an order for the work flow steps based on the confirmation information. Additionally, the computer-readable medium includes a third set of codes for causing a computer to manage the work flow by (i) initiating the identified work flow steps in the specified order, and (ii) implementing a plurality of profile handlers to verify execution of the data collection processes at respective DLT networks, wherein each profile handler includes a profile of data collection steps for a specific data collection process of the work flow. Moreover, the computer-readable medium includes a fourth set of codes for causing a computer to execute a data collection extension at a node within each of the plurality of DLT networks to (i) receive a call out to perform a data collection process included with the work flow, (ii) extract data from a distributed ledger within a corresponding DLT network; and (iii) communicate the data a work flow managing-entity.

In specific embodiment of the computer program product the third set of codes is further configured to cause the computer to manage the work flow by (iii) communicating the data received from the plurality of DLT networks to one of more of a plurality of legacy systems within an enterprise requiring the data.

In still further specific embodiments of the computer program product the fourth set of codes is further configured to cause the data collection extension to segregate data according to data type in corresponding data structures within one of physical memory or logical memory. In additional specific embodiments of the computer program product the fourth set of codes is further configured to create a data collection layer within the data collection extensions that is configured to manage connectivity between the data collection extension and the work flow managing-entity.

Moreover, in additional specific embodiments the computer program product includes a fifth set of codes for causing a computer to create a data transport layer configured to manage connectivity between the work flow managing-entity and the plurality of legacy systems.

Thus, systems, apparatus, methods, and computer program products herein described in detail below provide managing the collection of data from multiple different Distributed Ledger Technology (DLT) networks for a large-scale work flow having multiple interdependent data collection processes. The invention is able to coordinate and orchestrate the collection of data from any DLT network to any legacy landscape. The invention is configured to manage and initiate data collection processes, in a specified order, across multiple different DLT networks. As a result, the invention can leverage the areas of expertise afforded by each of the different DLT networks used to conduct interdependent data collection processes of the work flow. In addition, through use data collection extensions the present invention provides the capability to collect data from any known or future known DLT network and communicate the data to any requesting legacy.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for managing the collection of data from multiple different Distributed Ledger Technology (DLT) networks for a large-scale work flow having multiple interdependent data collection processes. As a result, the present invention can leverage the areas of expertise afforded by each of the different DLT networks used to conduct interdependent data collection processes of the work flow. In addition, through the use of data collection extensions the present invention provides the capability to collect data from any known or future known DLT network. Moreover, the present invention provides for any legacy domain system to communicate with the data curator and request and receiving DLT network stored data.

The invention provides for a data curator that is able to coordinate and orchestrate the collection of data from any DLT network and communication of the data to any legacy landscape, such as, different legacy domains within an enterprise. The data curator is able to receive configuration information, from an aforementioned configuration assistant, and identify the work flow steps and order for the large-scale work flow. As such, the data curator is able to manage and initiate data collection processes, in a specified order, across multiple different DLT networks. In addition, the data curator relies on profile handlers, which have a profile that is specific to a data collection process and a DLT network. The profile provides the steps that are to be performed at the DLT/network node for the specific data collection process. In this regard, the data curator is aware of how the DLT network functions when performing the data collection process. As such, the data curator can rely on the profile handler to verify that the required data collection operation has been properly completed at the specified DLT network/node.

In addition, the invention relies on data collection extensions, otherwise referred to as plug-ins, that are deployed at a node of each of the specific DLT networks (e.g., a node associated with the enterprise undertaking the large-scale work flow). The data collection extensions are configured to receive calls outs from the data curator and, in response, extract the data from the DLT's distributed ledgers and communicate the data back to the data curator in an organized fashion. In specific embodiments, the data collection extensions include a data collection layer, which provides for the data collection extension to effectively manage the data collection process. Moreover, efficiency in data collection is made possible by the data collection extension having the capability to segregate data according to data type in corresponding data structures within one of physical memory or logical memory.

Figure 1:
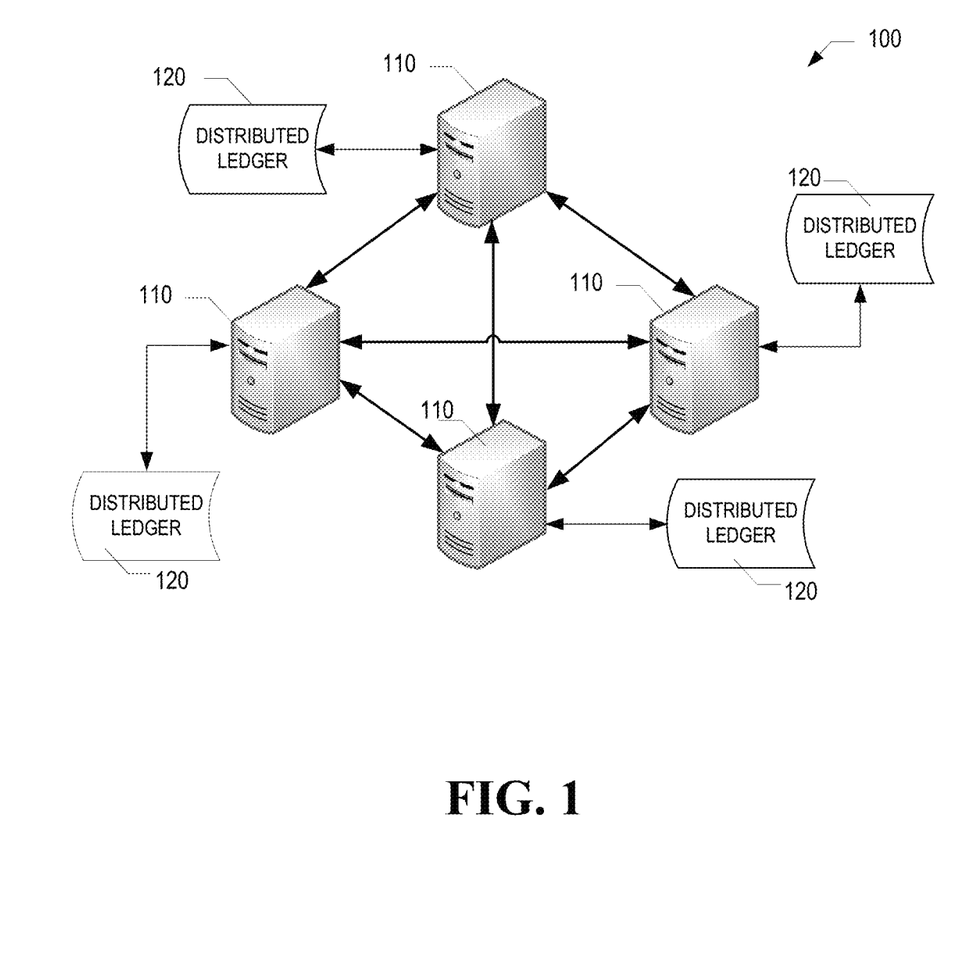
FIG. 1 provides a schematic diagram of an exemplary distributed Ledger technology (DLT) network including a plurality of decentralized nodes, in accordance with embodiments of the present invention.

Referring to FIG. 1, a schematic diagram is provided of an exemplary distributed ledger technology network 100, in accordance with embodiments of the present invention. A Distributed Ledger Technology (DLT) network 100 (otherwise referred to as a "block chain" or "blockchain network") is a distributed database (i.e., distributed ledger 120) that maintains, e.g., a list of data records, or the like. In specific embodiments of the invention the data records may include any data records associated with an enterprise work flow, e.g., a financial institution work flow, which may include, but is not limited to, payment data records, trade data records, identity data records, collection data records, securities data records and the like. The security of the data maintained within a distributed ledger 120 is enhanced by the distributed nature of the ledger. A DLT network 100 typically includes several nodes 110, which may be one or more systems, machines, computers, databases, data stores or the like operably connected with one another. In some cases, each of the nodes 110 or multiple ones of nodes 110 are maintained by different entities. A DLT network 100 typically works without a central repository or single administrator. One well-known application of DLT network is the public ledger of transactions, commonly referred to as blockchain, for cryptocurrencies such as used in bitcoin transactions. The data records recorded in a DLT network are enforced cryptographically and stored on the nodes 100 of the block chain.

A distributed ledger 120 provides numerous advantages over traditional databases. A large number of nodes 110 of a DLT network 100 may reach a consensus regarding the validity of resources maintained with a block of the ledger, e.g., a transaction, identity, trade, payment security or the like maintained on a distributed ledger 120. Additionally, when multiple versions of a data record exits on the distributed ledger 120, multiple nodes 110 can converge on the most up-to-date version of the data record. For example, any node 110 within the DLT network 100 that stores a data record can determine, within a level of certainty, whether the data record can be authenticated/authorized to take place and become final by confirming that no conflicting data records are confirmed by the DLT network elsewhere.

The DLT network 100 typically has two primary types of records. The first type is the record type, which consists of the actual data stored in the distributed ledger 120. The second type is the block type, which are records that confirm when and in what sequence certain events became recorded as part of the distributed ledger 110. Data records and the events associated therewith are created by participants using the DLT network 100 in its normal course of business, for example, when a data record is formed, a block(s) is created by users known as "miners" who use specialized software/equipment to create blocks. Holders (also, referred to as "users") of a block of the distributed ledger form the commitment to the event (e.g., payment, trade, or the like) and the related data records are passed around to various nodes 110 of the DLT network 100. A "valid" data record or related event is one that can be validated based on a set of rules that are defined by the particular system implementing the DLT network 100. For example, in the case of a payment, a valid payment is one that authenticates the user and authorizes the financial institution to access the account holding the financial resources to be transferred.

A DLT network 100 is typically decentralized—meaning that a distributed ledger 120 (i.e., a decentralized ledger) is maintained on multiple nodes 110 of the DLT network 100. One node 110 in the DLT network 100 may have a complete or partial copy of the entire distributed ledger 120 or set of records and/or blocks on the DLT network 100. Events are initiated at a node 110 of the DLT network 100 and communicated to the various nodes 110 of the DLT network 100. Any of the nodes 110 can validate a data record or an associated event, add the record or the details of the event to its copy of the distributed ledger 120, and/or broadcast the record or details of the event, its associated validation (in the form of a block) and/or other data to other nodes 110.

As previously discussed different DLT network 100 exist with each DLT network 100 being especially suited to solve one, or in some instances more than one, independent problems or tasks (referred to herein as independent "processes"). In this regard, each DLT network 100 may have its own area of expertise. For example, one DLT network 100 may be especially configured for creating/verifying identity, while another DLT network 100 may be especially configured for foreign exchange transactions and the like. As discussed in detail below the present invention provides for a work flow having multiple different interdependent processes (otherwise referred to as "problems" or "tasks") to conduct the processes on different DLT networks 100, so as to leverage the area of expertise afforded by the different DLT networks 100.

Figure 2:
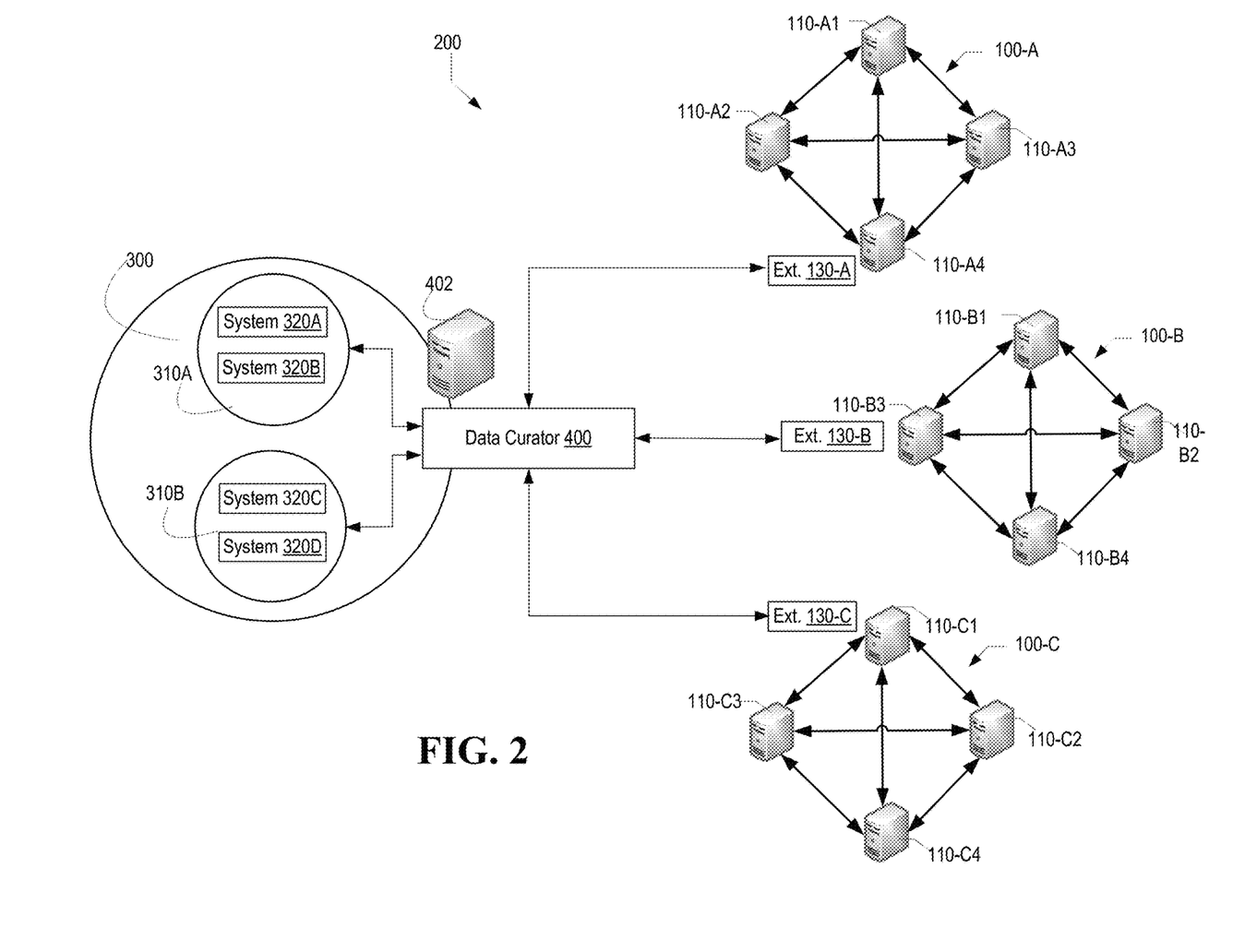
FIG. 2 provides a schematic diagram of a system for managing a work flow including multiple interdependent data collection processes from different DLT networks, in accordance with embodiments of the present invention.

Referring to FIG. 2 a schematic diagram is provided of a system 200 for managing a work flow that includes interdependent processes requested by different domains 310A and requiring execution on different Distributed Ledger Technology (DLT) networks 100-A, 100-B, 100-C, in accordance with embodiments of the present invention. The system 200 includes a data curator 400 that is executed by a computing platform, embodied in one or more computing apparatus 402, such as a server(s) or the like. The computing platform may reside within an enterprise 300 or elsewhere within a distributed computing environment (not shown in FIG. 2), such as the Internet and/or intranet(s). The data curator 400 is configured to receive configuration information for conducting a work flow that includes a plurality of data collection processes executed on a plurality of different DLT networks 100-A, 100-B, 100-C and the like. The configuration information is used, at a minimum, to identify the work flow steps and specify an order (i.e., orchestrate) work flow steps. In specific embodiments of the invention the system 100 includes a configuration assistant (not shown in FIG. 2), in the form of a user interface configured to receive user inputs that define the configuration information. The configuration assistant may be a component of the data curator or may be a separate component of the system 100 stored and/or executed on a different computing platform than the data curator 400.

The data curator 400 is configured to manage the work flow by initiating the work flow steps in the specified order and linking the interdependent processes performed on one DLT network 100 to one or more other interdependent processes performed on one or more other DLT networks 100. In this regard, the data curator 400 of the present invention acts as a technical operant that understands the process that is occurring on each of the DLT networks 100 specific to the overall workflow and, as such, is able to integrate and orchestrate the execution of the interdependent processes at the various different DLT networks 100. The data curator 400 is able to understand what is occurring on each DLT network through implementation of profile handlers that include a profile of the data collection steps for a specific data collection process and for a specific DLT network. In this regard, the data curator 400, through use of the profile handlers, is aware of the logic that the DLT networks use to perform the process (e.g., collect the data) and, as such, as able to "demystify" or otherwise understand the processes for the purpose of orchestrating the linking of one interdependent process to one or more other interdependent process(es).

The system additionally includes a plurality of data collection extensions 130A, 130-B, 130-C, otherwise referred to as "plug-ins". Each data collection extension 130 is stored within and executed at a node 110A4, 110-B3, 110-C1 within one of the DLT networks 100-A, 100-B and 100-C. The node 110A4, 110-B3, 110-C1 of the DLT network 100-A, 100-B and 100-C at which the data collection extension may be a node associated with the enterprise 300 that is executing the comprehensive multi-interdependent process work flow. The data collection extensions 130A, 130-B, 130-C are configured to receive a call out from the data curator 400 to perform a data collection process, extract the applicable data from a distributed ledger 120 (shown in FIG. 1) within a corresponding DLT network 100-A, 100-B and 100-C, and, in response, communicate the data to the data curator. In specific embodiments of the invention, the data collection extensions 130A, 130-B, 130-C include a data collection layer, published as service/APIs or the like, which are configured to assist the data collection extensions 130A, 130-B, 130-C is managing the data collection operations effectively and efficiently.

In response to receiving the data from the data collection extensions 130A, 130-B, 130-C, the data curator 400 is further configured to communicate the data to the requesting legacy system 320A, 320B, 320C or 320D within a domain/business unit 310A, 310B of the enterprise 300. For an enterprise, such as a financial institution or the like, the domains may include, but are not limited to, collection, security, payments, trades and the like. The legacy systems 320A, 320B, 320C or 320D may be any legacy system, application, module, software, middleware or the like that is conventionally used as a platform for conducting the process or collecting the data required.

Figure 3:
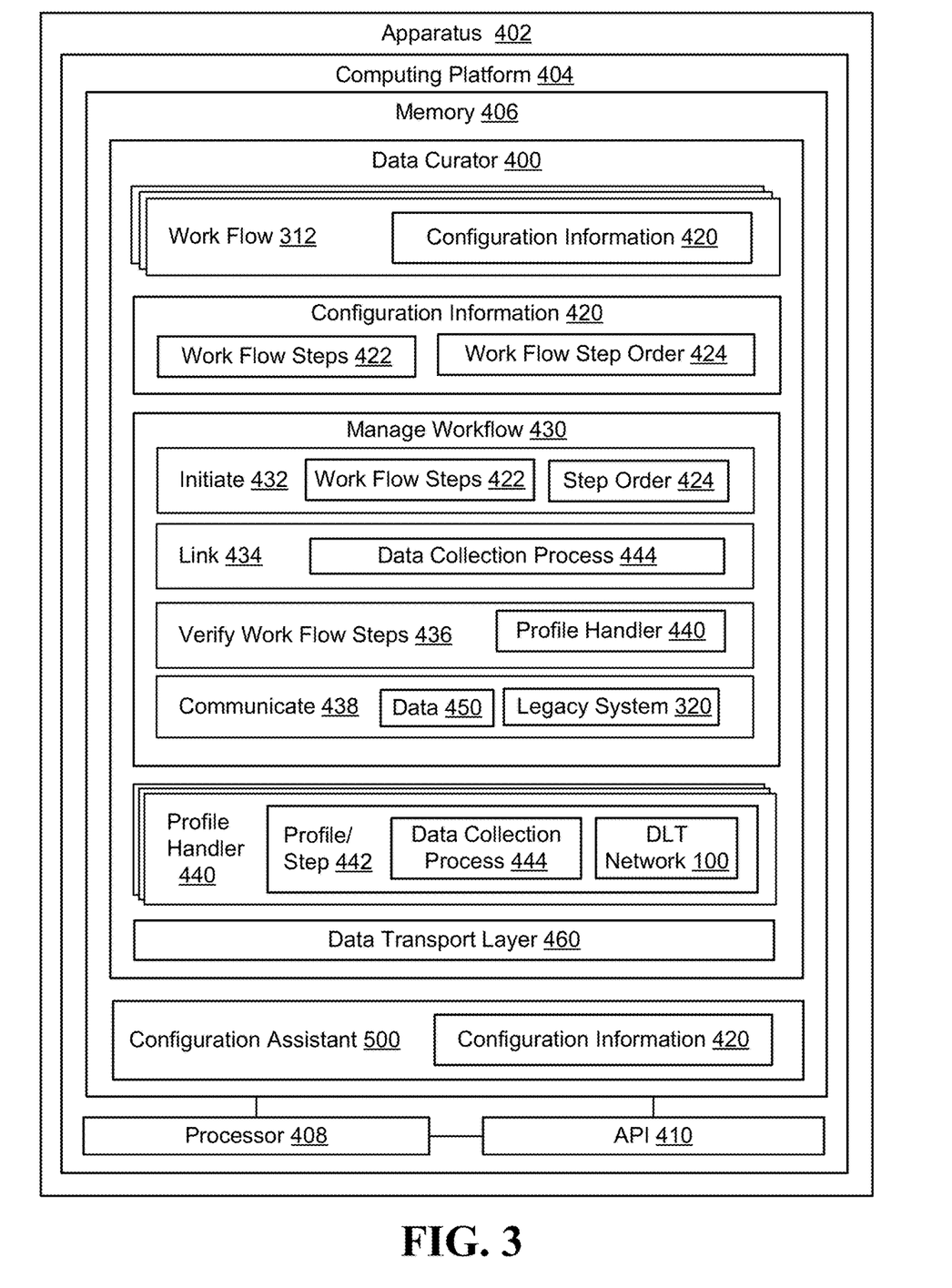
FIG. 3 provides a block diagram of a data curator apparatus for managing the collection of data within a large-scale work flow having multiple interdependent data collection processes implicating multiple different DLT networks, in accordance with embodiments of the present invention.

Referring to FIG. 3 a block diagram is presented of apparatus 402 configured to store and execute a data curator 400, in accordance with embodiments of the present invention. In addition to providing more details for the data curator 400, FIG. 3 provides various optional embodiments of the systems, apparatus and methods of the present invention. The apparatus 402 includes a computing platform 404 having a memory 406 storing instructions therein, and a processor 408 in communication with the memory. The memory 406 may comprise volatile and non-volatile memory, such as read-only and/or random-access memory (RAM and ROM), EPROM, EEPROM, flash cards, or any memory common to computer platforms). Moreover, memory 406 may comprise cloud storage, such as provided by a cloud storage service and/or a cloud connection service.

The processor 408 may be application-specific integrated circuits ("ASICs"), or other chipsets, logic circuits, or other data processing device(s). Processor 408 may execute an application programming interface ("API") 410 that interfaces with any resident programs (i.e., data curator 400 stored in the memory 406 of the computing platform 404. Processor 408 may include various processing subsystems (not shown in FIG. 3) embodied in hardware, firmware, software, and combinations thereof, that enable the functionality of the computing platform 404 and the operability of the computing platform 404 on a distributed computing network (not shown in FIG. 3). For example, processing subsystems allow for initiating and maintaining communications and exchanging data with other networked devices, such as the data collection extensions 130 of DLT network nodes 110. For the disclosed aspects, processing subsystems of processor 408 may include any subsystem used in conjunction with data curator 400 and related, codes, routines, sub-routines, algorithms, sub-algorithms, modules, sub-modules thereof.

The computing platform 404 additionally includes a communication mechanism (not shown in FIG. 3) embodied in hardware, firmware, software, and combinations thereof, that enables electronic communications between the computing platform 404 and other platforms, apparatus and/or devices, such as legacy systems 320 and the nodes 130 of DLT networks 100 (shown in FIG. 2). Thus, communication module may include the requisite hardware, firmware, software and/or combinations thereof for establishing and maintaining a network communication connection.

The processor 408 is configured to execute instructions stored in the memory 406 including instructions associated with data curator 400. The data curator 400 is configured to configured to receive configuration information 420 for conducting a one or more work flows 312 that includes a plurality of data collection processes 444 executed on a plurality of different DLT networks 100-A, 100-B, 100-C and the like. The configuration information 420 is used, at a minimum, to identify the work flow steps 422 and specify a work flow step order 424.

In specific embodiments of the apparatus 402 includes a configuration assistant 500, in the form of a user interface configured to receive inputs that define the configuration information 420. While the configuration assistant 500 is shown in FIG. 3 as being within the same apparatus 402 is the data curator 402, the configuration assistant may, in specific embodiments of the invention, be stored and/or executed on a different computing device than the data curator 400. In addition to receiving configuration information specific to a work flow, the configuration assistant 400 may, in specific embodiments, be configured to receive information that on-boards a legacy system 320 (shown in FIG. 2) to request data collection processing from a current or new DLT network 100 (shown in FIG. 2) and as result, the data curator 400, can identify the on-boarded legacy system 320 as the data recipient.

Further, the data curator 400 is configured to manage 430 the work flow 312 by initiating the work flow steps 422 in the specified order 424 and link 434 the interdependent data collection processes 444 performed on one DLT network 100 to one or more other interdependent processes 444 performed on one or more other DLT networks 100. As such, the data curator 400 understands the process that is occurring on each of the DLT networks 100 specific to the overall work flow 312 and is able to integrate and orchestrate the execution of the interdependent processes 444 at the various different DLT networks 100.

The data curator 400 is able to understand what is occurring on each DLT network through implementation of profile handlers 440 that include a profile 442 or listing the data collection steps for a specific data collection process 444 and for a specific DLT network 100. In specific embodiments of the invention, the data curator implements facades patterns for each domain level (i.e., data collection process type) and at each DLT network level to provide a simpler interface at the nodes. The data curator 400, through use of the profile handlers 440, is aware of the logic that the DLT networks use to perform the process (e.g., collect the data) and, as such, as able to "demystify" or otherwise understand the processes for the purpose of orchestrating the linking of one interdependent process to one or more other interdependent process(es). Thus, the profile handlers 440, which are preconfigured into the data curator 440, include the DLT-specific code used by the specific DLT network 100 to conduct the specific data collection process 444. The profile handles are supported by data access object (DAO) and data transfer object (DTO) layers in the data curator 400. Further, the DAO and DTO layers provide the means for collating the data and, as such, there is no need to separately code for collating the data between the DLT networks 100 and the legacy systems 320.

In further embodiments of the invention, the profile handlers 440 are used to verify 436 the progress, and/or successful completion of a work flow step 422 (e.g., a data collection process 444). In addition, the data curator 400 is configured to communicate 438 the data 450 extracted from the DLT networks 100 to one or more of the requesting legacy systems 320. In such embodiments of the apparatus, the data curator 440 relies on a common data transport layer 460 that is provided to the requesting legacy system(s) 320 to communicate responses (i.e., the data 450) to the requesting legacy system(s) 320.

Figure 4:
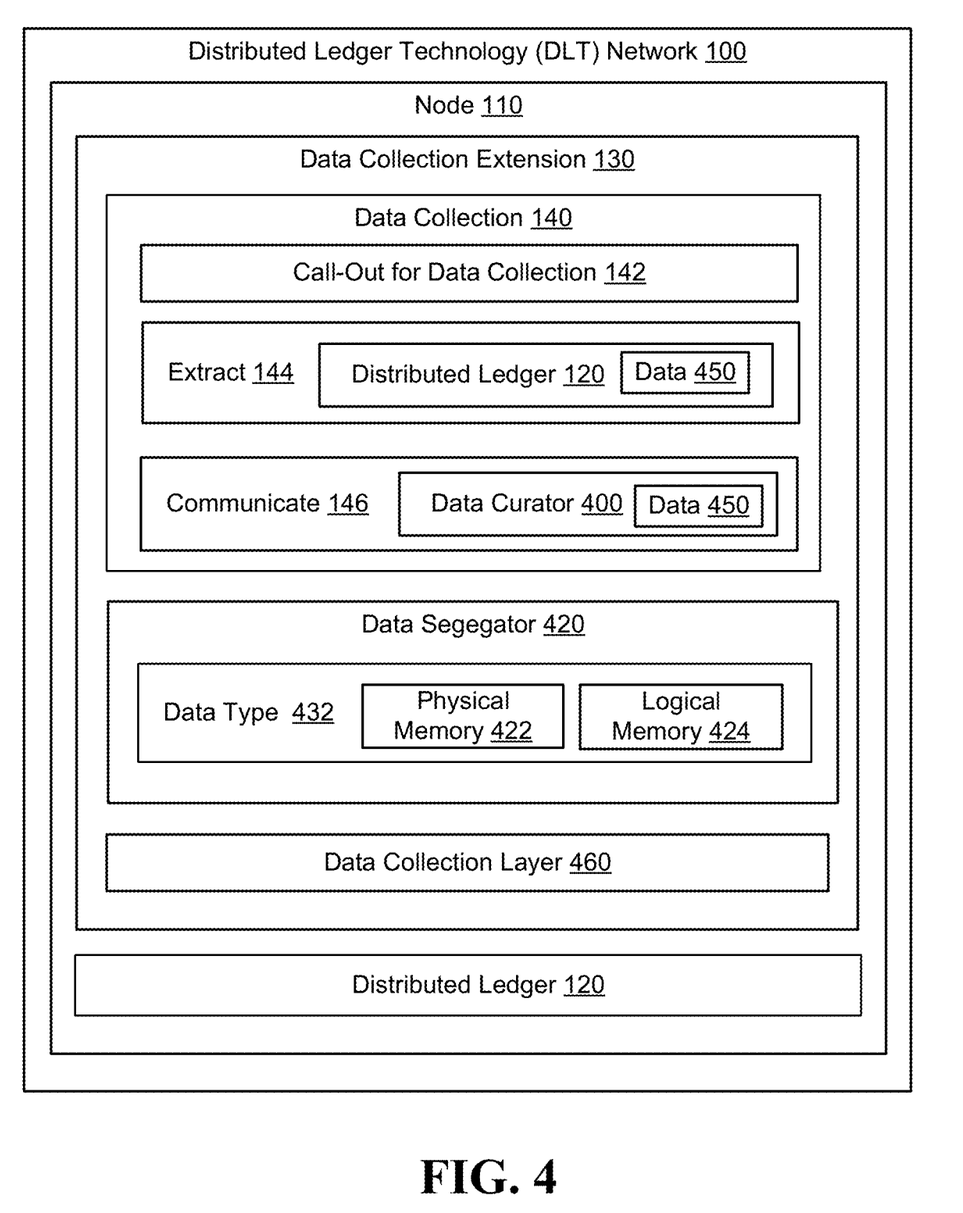
FIG. 4 provides a block diagram of a data collection extension deployed at nodes within a DLT network for efficiently collecting data in response to call outs from a data curator, in accordance with embodiments of the present invention.

Referring to FIG. 4 a block diagram is presented of a data collection extension 130 executing on a node 110 within a DLT network 100, in accordance with embodiments of the present invention. As previously discussed a data collection extension 130 will be deployed on a node 110 of each DLT network 100 from which the data curator requests a data collection process to be performed.

The data collection extension 130 is configured to perform data collection 140 by receiving a call out 142 from the data curator 400 (shown in FIG. 3) to perform a data collection process, extract 144 the applicable data 450 from a distributed ledger 120 (shown in FIG. 1) within a corresponding DLT network 100, and, in response, communicate 146 the data 450 to the data curator 400 (Shown in FIG. 3). In specific embodiments of the invention, the data collection extension 130 includes a data collection layer 460, published as service/APIs or the like, which are configured to assist the data collection extension 130 is managing the data collection operations effectively and efficiently and communicating the data from the data extension 1320 to the data curator 400.

In further specific embodiments of the invention, the data collection extension 130 includes a data segregator 420 configured to segregate data by data type 432 (e.g., identity, payment, trade, collections and the like) in specific data structures stored in physical memory 422 or logical memory 424 for the purpose of organized and efficient extraction of the data from the distributed ledgers.

Figure 5:
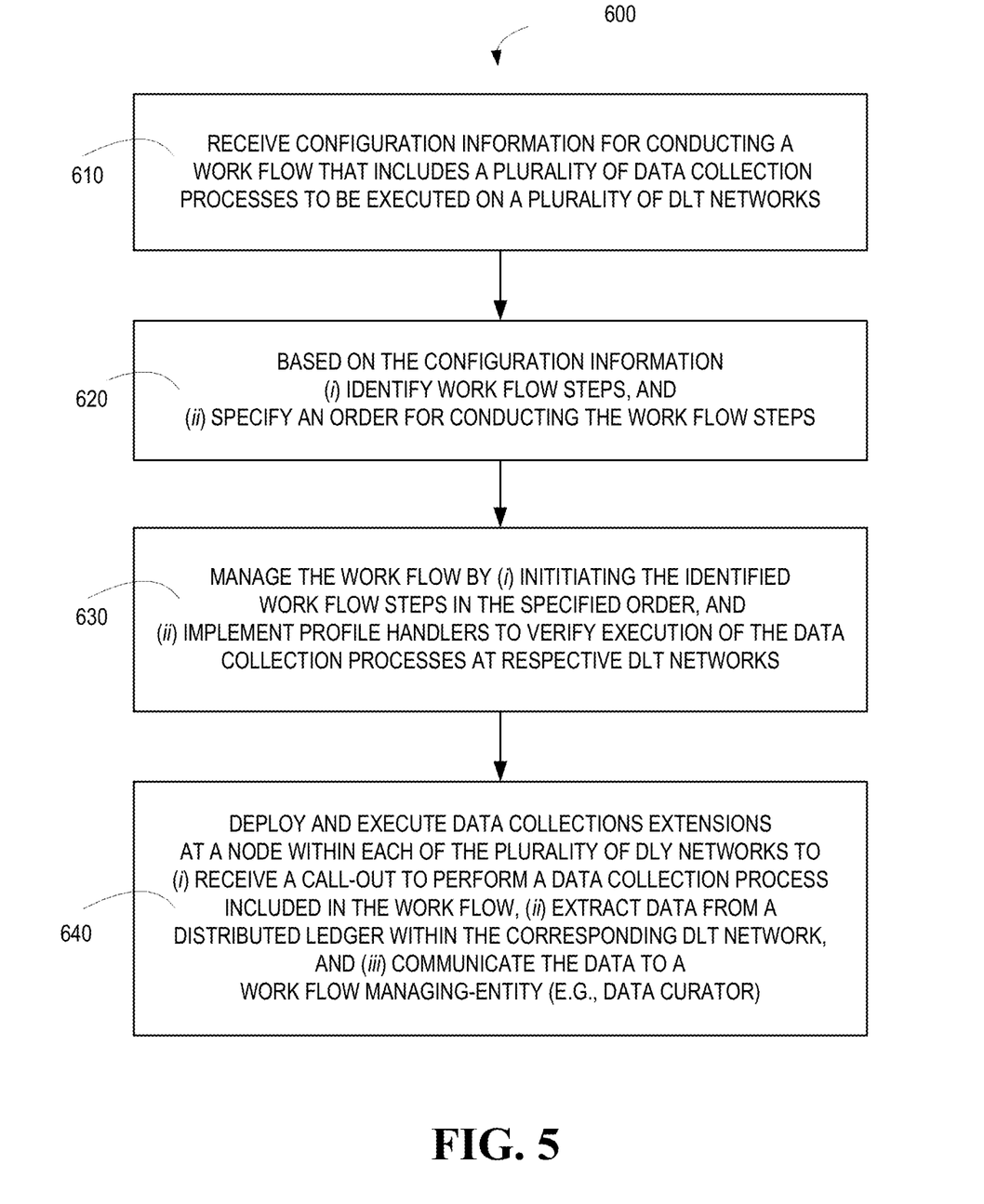
FIG. 5 provides a flow diagram of a method for managing a work flow including multiple interdependent data collection processes from different DLT networks, in accordance with embodiments of the present invention.

Referring to FIG. 5 a flow diagram is presented of a method 600 for managing a work flow including multiple interdependent data collection processes requiring execution on different DLT networks, in accordance with embodiments of the present invention. At Event 610, configuration information is received for conducting a work flow that includes a plurality of interdependent data collection processes to be executed on more than one DLT network. For example, in an enterprise, such as a financial institution the work flow may be an import/export operation that has multiple different interdependent data collection operations. In such an example, the multiple data collection processes may include, but are not limited to, trade (e.g., exchanging Letters of Credit (LOC)), document management, transaction processing (i.e., payments) and the like. Each of these data collection processes is implemented on a different a DLT network; specific to the area of expertise associated with the DLT network. As previously discussed, in specific embodiments of the invention the configuration information is received via a configuration assistant, which is configured as user-interface(s) for receiving user inputs pertaining to specific work flow.

At Event 620, work flow steps are identified and the order for conducting the steps are specified based at least on the configuration information received and, in some embodiments of the profile handlers, which specify the DLT-specific code implemented at a specific DLT network for conducting data collection processes required by the work flow.

At Event 630, the work flow is managed by initiating the identified work flow steps in the specified order (i.e., sending callouts to data collection extensions deployed at the specific DLT networks) and linking the interdependent data collection processes, such that, completion of one interdependent data collection process triggers initiation of one or more other interdependent data collection processes. Further, the work flow is managed by implementing profile handlers to verify the execution of the data collection process at the respective DLT network. Each profile handler includes a profile of the data collection steps (i.e., the DLT-specific code used to conduct the data collection process) for a specific data collection process (e.g., identity, payment, trade, collection, securities or the like) required of the work flow.

At Event 640, data collection extensions are deployed and executed at a node within each of the plurality of DLT networks required to perform at least one of the data collection processes required by the work flow. The data collection extensions are configured to receive a call out from a data collection managing-entity (e.g., data curator) to perform a data collection process, extract the requisite data from the distributed ledger within the DLT network and communicate the data to the work flow managing-entity. In specific embodiment of the method, the data collection extension includes a data collection layer, published as a service/API or the like, to manage the data collection and provide a means for communicating the data to the data collection managing-entity (e.g., data curator). In further embodiments of the method, extracting the data includes segregating the data by data type (e.g., identity, payment, trade, collections and the like) in specific data structures stored in physical or logical memory for the purpose of organized and efficient extraction of the data from the distributed ledgers.

In further specific embodiments of the method (not shown in FIG. 5), the data received at the data collection managing-entity (e.g., data curator) is collated via different data access objects (DAOs) and Data transport objects (DTOs) and subsequently communicated, via a common data transport layer, to the requesting legacy systems within the enterprise.

Thus, systems, apparatus, methods, and computer program products described above provide for managing the collection of data from multiple different Distributed Ledger Technology (DLT) networks for a large-scale work flow having multiple interdependent data collection processes. The invention is able to coordinate and orchestrate the collection of data from any DLT network to any legacy landscape. The invention is configured to manage and initiate data collection processes, in a specified order, across multiple different DLT networks. As a result, the invention can leverage the areas of expertise afforded by each of the different DLT networks used to conduct interdependent data collection processes of the work flow. In addition, through use data collection extensions the present invention provides the capability to collect data from any known or future known DLT network and communicate the data to any requesting legacy.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing a work flow executed across a plurality of Distributed Ledger Technology (DLT) networks, the system comprising:

a computing platform including a memory and at least processor in communication with the memory;

a data curator stored in the memory, executable by the processor and configured to:

receive configuration information for conducting the work flow, the work flow including a plurality of data collection processes executed on a plurality of DLT networks, identify work flow steps and specify an order for the work flow steps based at least on the configuration information, link the data collection processes based on one or more interdependencies between two or more of the data collection processes such that completion of one data collection process on one DLT network triggers initiation of another data collection process on another DLT network; and manage the work flow by (i) initiating the identified work flow steps in the specified order, (ii) triggering initiation of data collection processes on the plurality of DLT networks based on linking, and (iii) implementing a plurality of profile handlers, each profile handler including a profile of data collection steps for a specific data collection process of the work flow and executed by a respective one of the DLT networks, wherein implementing the profile handlers includes verifying progress and completion of the data collection steps at the respective one of the DLT networks; and a plurality of data collection extensions, each data collection extension stored within and executing on a node within one of the plurality of DLT networks and configured to:
  receive a call out from the data curator to perform a data collection process included with the work flow,
  extract data from a distributed ledger within a corresponding DLT network, and
  communicate the data to the data curator.

2. The system of claim 1, wherein managing the work flow further comprises (iii) communicating the data received from the plurality of DLT networks to one of more of a plurality of legacy systems within an enterprise requiring the data.

3. The system of claim 2, wherein the data curator further comprises a data transport layer configured to manage connectivity between the data curator and the plurality of legacy systems.

4. The system of claim 1, wherein the data collection extensions are further configured to segregate data according to data type in corresponding data structures within one of physical memory or logical memory.

5. The system of claim 1, wherein the data collection extensions further comprise a data collection layer configured to manage the connectivity between the data curator and the data collection extension.

6. The system of claim 1, wherein the system further comprises a configuration assistant stored in the memory, executable by the processor and configured to receive first inputs that define the configuration information that manage the work flow.

7. The system of claim 6, wherein the configuration assistant is further configured to receive second inputs that are configured to onboard a legacy system.

8. The system of claim 1, wherein the data curator is further configured to receive a work flow-related query from a legacy system and, in response to receiving the query, make a call out to one or more of the data extensions to determine an answer to the query.

9. A computer-implemented method for managing a work flow executed across a plurality of Distributed Ledger Technology (DLT) networks, the method executed by one or more processing devices and comprising:
  receiving configuration information for conducting the work flow, the work flow including a plurality of data collection processes executed on a plurality of DLT networks;
  identifying work flow steps and specifying an order for the work flow steps based on the confirmation information;
  linking the data collection processes based on one or more interdependencies between two or more of the data collection processes such that completion of one data collection process on one DLT network triggers initiation of another data collection process on another DLT network;
  managing the work flow by (i) initiating the identified work flow steps in the specified order, (ii) triggering initiation of data collection processes on the plurality of DLT networks based on linking, and (iii) implementing a plurality of profile handlers to verify progress and execution of data collection steps at respective DLT networks, wherein each profile handler includes a profile of data collection steps for a specific data collection process of the work flow; and
  deploying and executing a plurality of data collection extensions at a node within each of the plurality of DLT networks to (i) receive a call out to perform a data collection process included with the work flow, (ii) extract data from a distributed ledger within a corresponding DLT network, and (iii) communicate the data to a work flow managing-entity.

10. The computer-implemented method of claim 9, wherein managing the work flow further comprises managing the work flow by (iii) communicating the data received from the plurality of DLT networks to one of more of a plurality of legacy systems within an enterprise requiring the data.

11. The computer-implemented method of claim 10, further comprising creating a data transport layer configured to manage connectivity between the work flow managing-entity and the plurality of legacy systems.

12. The computer-implemented method of claim 9, further comprising executing the data collection extension to segregate data according to data type in corresponding data structures within one of physical memory or logical memory.

13. The computer-implemented method of claim 9, wherein deploying and executing the plurality of data collection extensions further comprises creating a data collection layer within the data collection extensions that is configured to manage connectivity between the data collection extension and the work flow managing-entity.

14. The computer-implemented method of claim 9, further comprising receiving a work flow-related query from a legacy system and, in response to receiving the query, make a call out to one or more of the data extensions to determine an answer to the query.

15. A computer program product including a non-transitory computer-readable medium, the computer-readable medium comprising:
  a first set of codes for causing a computer to receive configuration information for conducting the work flow, the work flow including a plurality of data collection processes executed on a plurality of DLT networks;
  a second set of codes for causing a computer to identify work flow steps and specify an order for the work flow steps based on the confirmation information;
  a third set of codes for causing a computer to link the data collection processes based on one or more interdependencies between two or more of the data collection processes such that completion of one data collection process on one DLT network triggers initiation of another data collection process on another DLT network;
  a fourth set of codes for causing a computer to manage the work flow by (i) initiating the identified work flow steps in the specified order, (ii) triggering initiation of data collection processes on the plurality of DLT networks based on linking, and (iii) implementing a plurality of profile handlers to verify progress and execution of data collection steps at respective DLT networks, wherein each profile handler includes a profile of data collection steps for a specific data collection process of the work flow; and
  a fifth set of codes for causing a computer to execute a data collection extension at a node within each of the plurality of DLT networks to (i) receive a call out to perform a data collection process included with the work flow, (ii) extract data from a distributed ledger within a corresponding DLT network; and (iii) communicate the data a work flow managing-entity.

16. The computer program product of claim 15, wherein the fourth set of codes is further configured to cause the computer to manage the work flow by (iii) communicating the data received from the plurality of DLT networks to one of more of a plurality of legacy systems within an enterprise requiring the data.

17. The computer-implemented method of claim 16, further comprises a sixth set of codes for causing a computer to create a data transport layer configured to manage connectivity between the work flow managing-entity and the plurality of legacy systems.

18. The computer program product of claim 15, wherein the fifth set of codes is further configured to cause the data collection extension to segregate data according to data type in corresponding data structures within one of physical memory or logical memory.

19. The computer program product of claim 15, wherein the fifth set of codes is further configured to create a data collection layer within the data collection extensions that is configured to manage connectivity between the data collection extension and the work flow managing-entity.

* * * * *